(12) United States Patent
De Stefano et al.

(10) Patent No.: US 12,449,487 B2
(45) Date of Patent: Oct. 21, 2025

(54) DETECTION OF FAULTS IN REDUNDANT GROUNDING SYSTEMS

(71) Applicant: GM Global Technology Operations LLC, Detroit, MI (US)

(72) Inventors: Robert A. De Stefano, Macomb Township, MI (US); Jonathan O. Conell, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 456 days.

(21) Appl. No.: 18/154,390

(22) Filed: Jan. 13, 2023

(65) Prior Publication Data

US 2024/0241190 A1    Jul. 18, 2024

(51) Int. Cl.
*G01R 31/52* (2020.01)
*G01R 31/00* (2006.01)

(52) U.S. Cl.
CPC ........... *G01R 31/52* (2020.01); *G01R 31/007* (2013.01)

(58) Field of Classification Search
CPC .............................. G01R 31/52; G01R 31/007
See application file for complete search history.

(56) References Cited

U.S. PATENT DOCUMENTS

| | | | |
|---|---|---|---|
| 11,637,421 B2 * | 4/2023 | Pressman | H02H 3/16 361/42 |
| 2010/0052419 A1 * | 3/2010 | Oosawa | B60L 50/66 307/10.1 |
| 2012/0299598 A1 * | 11/2012 | Alley | G01R 31/52 324/509 |
| 2015/0346259 A1 * | 12/2015 | Jiang | H04L 12/40006 324/538 |
| 2015/0362543 A1 * | 12/2015 | Gale | G01R 31/006 324/503 |
| 2016/0258993 A1 * | 9/2016 | Bagchi | G01R 31/52 |

FOREIGN PATENT DOCUMENTS

| | | | | |
|---|---|---|---|---|
| DE | 102015108995 A1 | * | 12/2015 | ........... G01R 31/006 |
| WO | WO-2017008057 A1 | * | 1/2017 | ........... G01R 31/007 |

* cited by examiner

*Primary Examiner* — Lisa M Caputo
*Assistant Examiner* — Nyla Gavia
(74) *Attorney, Agent, or Firm* — CANTOR COLBURN LLP

(57) ABSTRACT

A method of detecting ground loss of an electrical component includes monitoring a ground circuit including a first ground line connected to the electrical component and a second ground line connected to the electrical component, where the monitoring includes measuring a current through each of the first ground line and the second ground line, and measuring a voltage through each of the first ground line and the second ground line. The method also includes calculating a first resistance of the first ground line and a second resistance of the second ground line based on the measured current and the measured voltage, estimating a difference between the first resistance and the second resistance, and comparing the estimated difference to a threshold difference, and based on the estimated difference being greater than the threshold difference, detecting a ground fault, and outputting an indication of the ground fault.

20 Claims, 5 Drawing Sheets

DETECTION OF FAULTS IN REDUNDANT GROUNDING SYSTEMS

INTRODUCTION

The subject disclosure relates to electrical systems of vehicles and other devices and systems, and more specifically, to detection and/or diagnosis of ground faults.

Redundant grounding is used in a variety of contexts, including automotive applications. For example, in electric vehicles (EV) and hybrid electric vehicles (HEV), redundant ground lines are used between vehicle ground (e.g., a vehicle chassis) and control units to ensure consistent operation and prevent damage to electrical components. Detection of ground faults is thus an important aspect of effective vehicle operation and operation of other electrical devices and systems.

SUMMARY

In one exemplary embodiment, a method of detecting ground loss of an electrical component includes monitoring a ground circuit including a first ground line connected to the electrical component and a second ground line connected to the electrical component, where the monitoring includes measuring a current through each of the first ground line and the second ground line, and measuring a voltage through each of the first ground line and the second ground line. The method also includes calculating a first resistance of the first ground line and a second resistance of the second ground line based on the measured current and the measured voltage, estimating a difference between the first resistance and the second resistance, and comparing the estimated difference to a threshold difference, and based on the estimated difference being greater than the threshold difference, detecting a ground fault, and outputting an indication of the ground fault.

In addition to one or more of the features described herein, the calculating and estimating the difference is performed at each of a plurality of time points.

In addition to one or more of the features described herein, the method further includes diagnosing the ground fault based on a number of time points for which the ground fault is detected.

In addition to one or more of the features described herein, diagnosing the ground fault includes determining a level of severity of the ground fault based on at least one of a value of the estimated difference, a number of time points at which the ground fault is detected, and a length of a time period during which the ground fault is detected.

In addition to one or more of the features described herein, the ground fault is diagnosed as an intermittent fault based on the number of time points being greater than a first threshold number, and the ground fault is diagnosed as a permanent fault based on the number of time points being greater than a second threshold number, the second threshold number being greater than the first threshold number.

In addition to one or more of the features described herein, the ground circuit includes a first switch connected between the first ground line and the electrical component and a second switch connected between the second ground line and the electrical component.

In addition to one or more of the features described herein, calculating the first resistance and the second resistance includes generating a current through the electrical component, measuring a first current through the first ground line, a second current through the second ground line and a total current when the first switch and the second switch are closed, measuring a first voltage of the electrical component when the first switch is closed and the second switch is open, measuring a second voltage of the electrical component when the first switch is open and the second switch is closed, and calculating the first resistance and the second resistance based on a difference between the first voltage and the second voltage, the first current, the second current and the total current.

In addition to one or more of the features described herein, the first resistance is calculated based on:

$$R_{G1} = (V_{M2} - V_{M1})/(I^*(1 - I_{G1}/I_{G2})),$$

and
the second resistance is calculated based on:

$$R_{G2} = (V_{M1} - V_{M2})/(I^*(1 - I_{G2}/I_{G1})),$$

where $R_{G1}$ is the first resistance, $R_{G2}$ is the second resistance, $V_{M1}$ is the first voltage, $V_{M2}$ is the second voltage, $I^*$ is the total current, $I_{G1}$ is the first current and $I_{G2}$ is the second current.

In addition to one or more of the features described herein, the electrical component is a control module of a vehicle.

In another exemplary embodiment, a system for detecting ground loss of an electrical component includes a ground circuit including a first ground line connected to the electrical component and a second ground line connected to the electrical component, and a processing device configured to measure a current through each of the first ground line and the second ground line, and measure a voltage through each of the first ground line and the second ground line. The processing device is configured to calculate a first resistance of the first ground line, and a second resistance of the second ground line based on the measured current and the measured voltage, estimate a difference between the first resistance and the second resistance, compare the estimated difference to a threshold difference, and based on the estimated difference being greater than the threshold difference, detecting a ground fault and outputting an indication of the ground fault.

In addition to one or more of the features described herein, the processing device is configured to calculate the first resistance and the second resistance, and estimate the difference at each of a plurality of time points.

In addition to one or more of the features described herein, the processing device is further configured to diagnose the ground fault based on a number of the time points for which the ground fault is detected.

In addition to one or more of the features described herein, the processing device is configured to determine a level of severity of the ground fault based on at least one of a value of the estimated difference, a number of time points at which the ground fault is detected, and a length of a time period during which the ground fault is detected.

In addition to one or more of the features described herein, the ground fault is diagnosed as an intermittent fault based on the number of time points being greater than a first threshold number, and the ground fault is diagnosed as a permanent fault based on the number of time points being greater than a second threshold number, the second threshold number being greater than the first threshold number.

In addition to one or more of the features described herein, the ground circuit includes a first switch connected between the first ground line and the electrical component and a second switch connected between the second ground line and the electrical component, and the processing device is configured to generate a current through the electrical component, measure a first current through the first ground line, a second current through the second ground line and a total current when the first switch and the second switch are closed, measure a first voltage of the electrical component when the first switch is closed and the second switch is open, measure a second voltage of the electrical component when the first switch is open and the second switch is closed, and calculate the first resistance and the second resistance based on a difference between the first voltage and the second voltage, the first current, the second current and the total current.

In addition to one or more of the features described herein, the first resistance is calculated based on:

$$R_{G1} = (V_{M2} - V_{M1})/(I^*(1 - I_{G1}/I_{G2})),$$

and
the second resistance is calculated based on:

$$R_{G2} = (V_{M1} - V_{M2})/(I^*(1 - I_{G2}/I_{G1})),$$

where $R_{G1}$ is the first resistance, $R_{G2}$ is the second resistance, $V_{M1}$ is the first voltage, $V_{M2}$ is the second voltage, $I^*$ is the total current, $I_{G1}$ is the first current and $I_{G2}$ is the second current.

In yet another exemplary embodiment, a vehicle system includes a memory having computer readable instructions, and a processing device for executing the computer readable instructions, the computer readable instructions controlling the processing device to perform a method, The method includes monitoring a ground circuit including a first ground line connected to an electrical component and a second ground line connected to the electrical component, where the monitoring includes measuring a current through each of the first ground line and the second ground line, and measuring a voltage through each of the first ground line and the second ground line. The method also includes calculating a first resistance of the first ground line, and a second resistance of the second ground line based on the measured current and the measured voltage, estimating a difference between the first resistance and the second resistance, and comparing the estimated difference to a threshold difference, and based on the estimated difference being greater than the threshold difference, detecting a ground fault, and outputting an indication of the ground fault.

In addition to one or more of the features described herein, the calculating and estimating the difference is performed at each of a plurality of time points, the method further including diagnosing the detected ground fault based on a number of the time points for which the ground fault is detected.

In addition to one or more of the features described herein, the ground fault is diagnosed as an intermittent fault based on the number of time points being greater than a first threshold number, and the ground fault is diagnosed as a permanent fault based on the number of time points being greater than a second threshold number, the second threshold number being greater than the first threshold number.

In addition to one or more of the features described herein, the ground circuit includes a first switch connected between the first ground line and the electrical component and a second switch connected between the second ground line and the electrical component.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
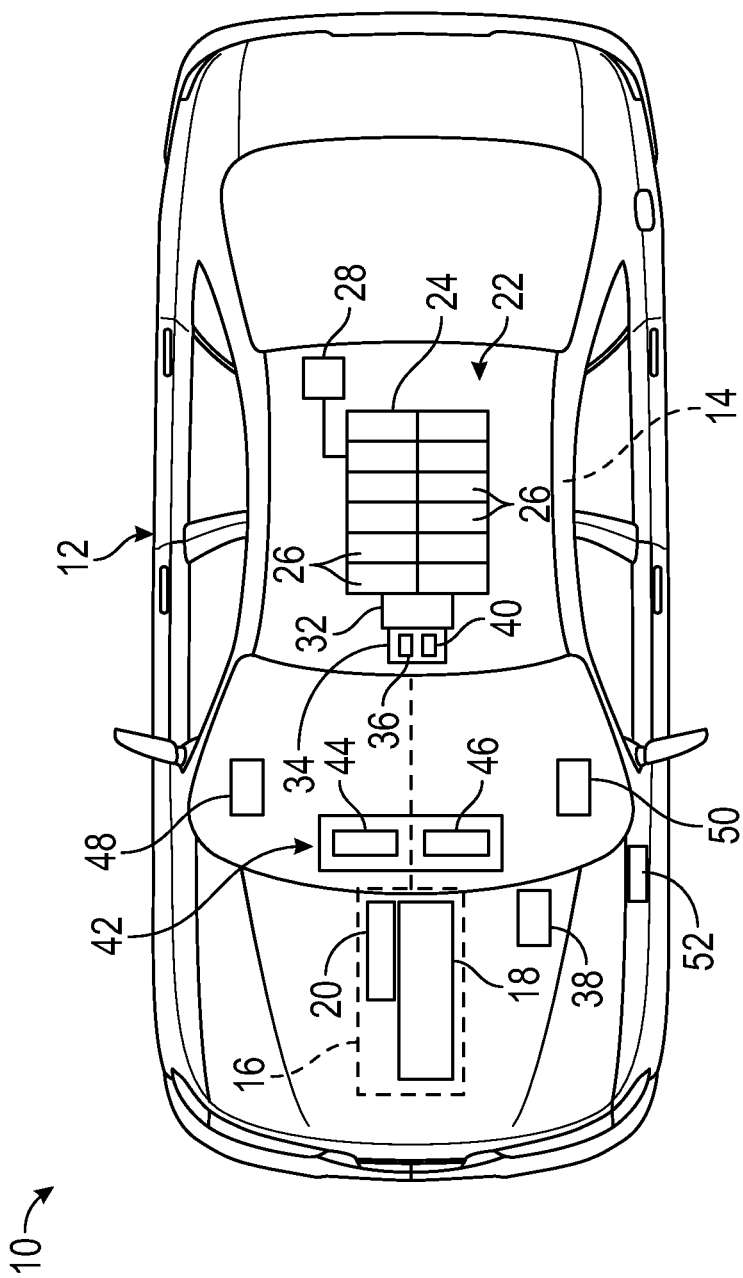
FIG. 1 is a top view of a motor vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for monitoring redundant grounding systems and detecting ground loss or ground faults. An embodiment of a method of detecting ground faults includes calculating resistances of each ground line in a redundant grounding system during a condition in which current is flowing through a connected electrical component (e.g., a vehicle control module). A ground fault may be detected based on a level of resistance or a difference between calculated resistances of two ground lines. The method may also include diagnosing a detected ground fault to determine a severity or type of ground fault.

Embodiments described herein present numerous advantages and technical effects. The embodiments provide effective methods of ground loss detection, which can provide for earlier detection of intermittent and permanent failures or faults than existing methods, as well as faster diagnosis of ground faults. In addition, the embodiments require fewer internal components for ground loss detection and are thus less complex than existing ground loss detection systems.

For example, existing vehicle modules that have redundant grounds either do not have any ground loss detection capability, or rely on complex circuitry to allow for detection of both intermittent and permanent faults. Embodiments described herein address such limitations by providing a relatively simple mechanism for ground fault detection, including intermittent and permanent faults) that can be used in vehicle systems.

The embodiments are not limited to use with any specific vehicle and may be applicable to various contexts. For example, embodiments may be used with automobiles, trucks, aircraft, construction equipment, farm equipment, automated factory equipment, medical devices, power supply systems and/or any other device or system for which redundant grounding may be desired.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. In an embodiment, the propulsion system 16 includes an electric motor 20, and may include one or more additional motors positioned at various locations. The vehicle 10 may be a fully electric vehicle having one or more electric motors.

The vehicle 10 includes a battery system 22, which may be electrically connected to the motor 20 and/or other components, such as vehicle electronics. The battery system 22 may be configured as a rechargeable energy storage system (RESS). In an embodiment, the battery system 22 includes a battery assembly such as a high voltage battery pack 24 having a plurality of battery modules 26. The battery system 22 may also include a monitoring unit 28 that includes components such as a processor, memory, an interface, a bus and/or other suitable components.

The battery system 22 is electrically connected to components of the propulsion system 16. The propulsion system also includes a DC-DC converter module 32 and an inverter module 34. The inverter module 34 (e.g., a traction power inverter unit or TPIM) converts direct current (DC) power from the battery system 22 to poly-phase alternating current (AC) power (e.g., three-phase, six-phase, etc.) to drive the motor 20. In an embodiment, the inverter module 34 includes an inverter 36 connected to the DC-DC-converter module 32 for receiving DC power, and is connected to the motor 20 for providing poly-phase AC power thereto.

The propulsion system 16 includes or is connected to a vehicle controller 38 that provides torque commands to a motor controller 40. The motor controller 40 may be part of the inverter module 34 or may be a separate module or unit.

The vehicle 10 also includes a computer system 42 that includes one or more processing devices 44 and a user interface 46. The various processing devices and units may communicate with one another via a communication device or system, such as a controller area network (CAN) or transmission control protocol (TCP) bus.

Various other control modules (electronic control modules or ECUs) may be included in the vehicle. For example, an auxiliary power module (APM) 48 is included for providing power to accessories (e.g., 12V loads). An on-board charger module (OBCM) 50 may be included, which connects the battery system 22 to a charge port 52, and controls aspects of charging the battery system 22 (e.g., from a charging station or other vehicle) and/or providing charge to an external system (e.g., vehicle-vehicle charging).

Figure 2:
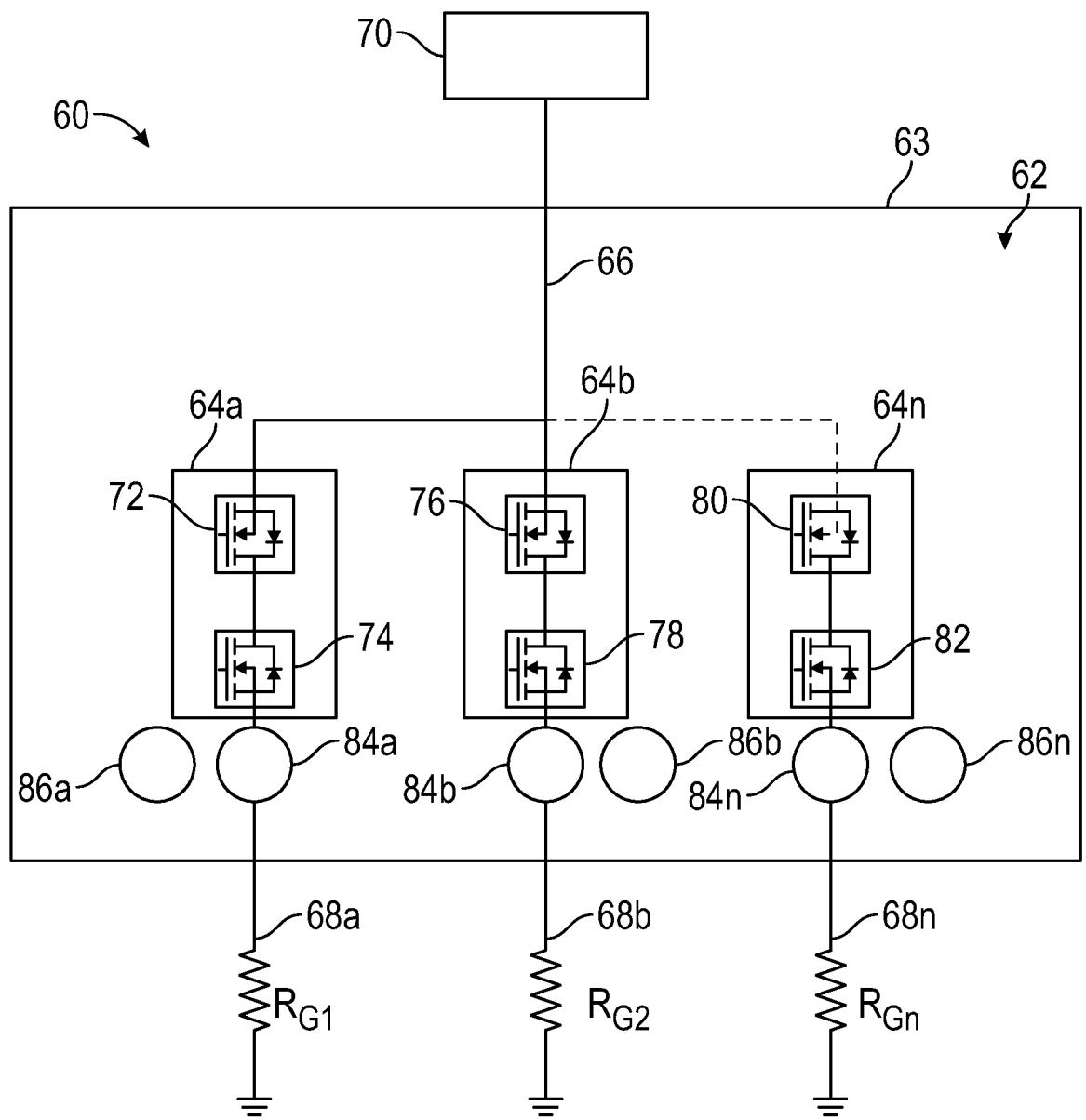
FIG. 2 schematically depicts components of a redundant grounding system, in accordance with an exemplary embodiment.

As noted herein, various control modules and other electrical components may feature a redundant ground circuit, also referred to as a "redundant ground" or "redundant grounding system." For example, one or more of the monitoring unit 28 (or other components of the battery system 22), the vehicle controller 38, the motor controller 40, the APM 48 and the OBCM 50 is grounded to a vehicle chassis via a redundant grounding system 60 (shown in FIG. 2).

FIG. 2 schematically depicts components of the redundant grounding system 60. The grounding system 60 includes a ground circuit 62 that includes a plurality of bi-directional switches including a first bi-directional switch 64a and a second bi-directional switch 64b. The ground circuit 62 may also include one or more additional bi-directional switches 64n. The bi-directional switches 64a, 64b and 64n are disposed on a panel 63 or other suitable support structure. The bi-directional switches 64a, 64b and 64n may be disposed separately relative to an electrical component 70, or internal to the component 70 (e.g., within a module housing). Any number of bi-directional switches may be included.

The bi-directional switches 64a, 64b and 64n are selectively connected to an electrical component 70 via one or more conductors 66. For example, the one or more conductors 66 are connected to ground nodes or terminals of the electrical component 70 (e.g., a control module). Each switch 64a, 64b and 64n is also connected to ground via respective ground lines 68a, 68b and 68n. As shown, the ground line 68a has a resistance $R_{G1}$, the ground line 68b has a resistance $R_{G2}$, and the ground line 68n has a resistance $R_{Gn}$.

Each bi-directional switch 64a, 64b and 64n may include a mechanical contactor, electronic switching device or any other suitable type of switch. In an embodiment, each bi-directional switch 64a, 64b and 64n includes one or more solid state relays or switches having semiconductor switching elements. As non-limiting examples, the switching elements may include metal-oxide-semiconductor (MOS)-controlled Thyristors (MCTs), gallium-nitride (GaN) field-effect transistors (FETs), metal-oxide-semiconductor field-effect transistors (MOSFETs), silicon carbide junction field-effect transistors (SiC JFETs), insulated-gate bipolar transistors (IGBTs) or any other suitable device having suitable voltage and current ratings.

In an embodiment, each bi-directional switch 64a, 64b and 64n is an active switch that is able to block current I in both directions. For example, the bi-directional switch 64a includes a power switch 72 (e.g., MOSFET) configured to block current in a first direction (toward the electrical component 70) and a power switch 74 configured to block current in a second direction (toward ground). Likewise, the switch 64b includes a power switch 76 configured to block current in the first direction and a power switch 78 configured to block current in the second direction, and the switch 64n includes a power switch 80 configured to block current in the first direction and a power switch 82 configured to block current in the second direction.

The grounding system 60 includes or is connected to various sensors for monitoring electrical parameters, including voltage and current through the ground lines. In an embodiment, an ammeter 84a measures current $I_{G1}$, through the ground line 68a, an ammeter 84b measures current $I_{G2}$, through the ground line 68b, and an ammeter 84n measures current $I_{Gn}$ through each ground line 68n. A voltmeter 86a measures voltage $V_{G1}$, a voltmeter 86b measures voltage $V_{G2}$, and a voltmeter 86n measures voltage $V_{Gn}$.

Figure 3:
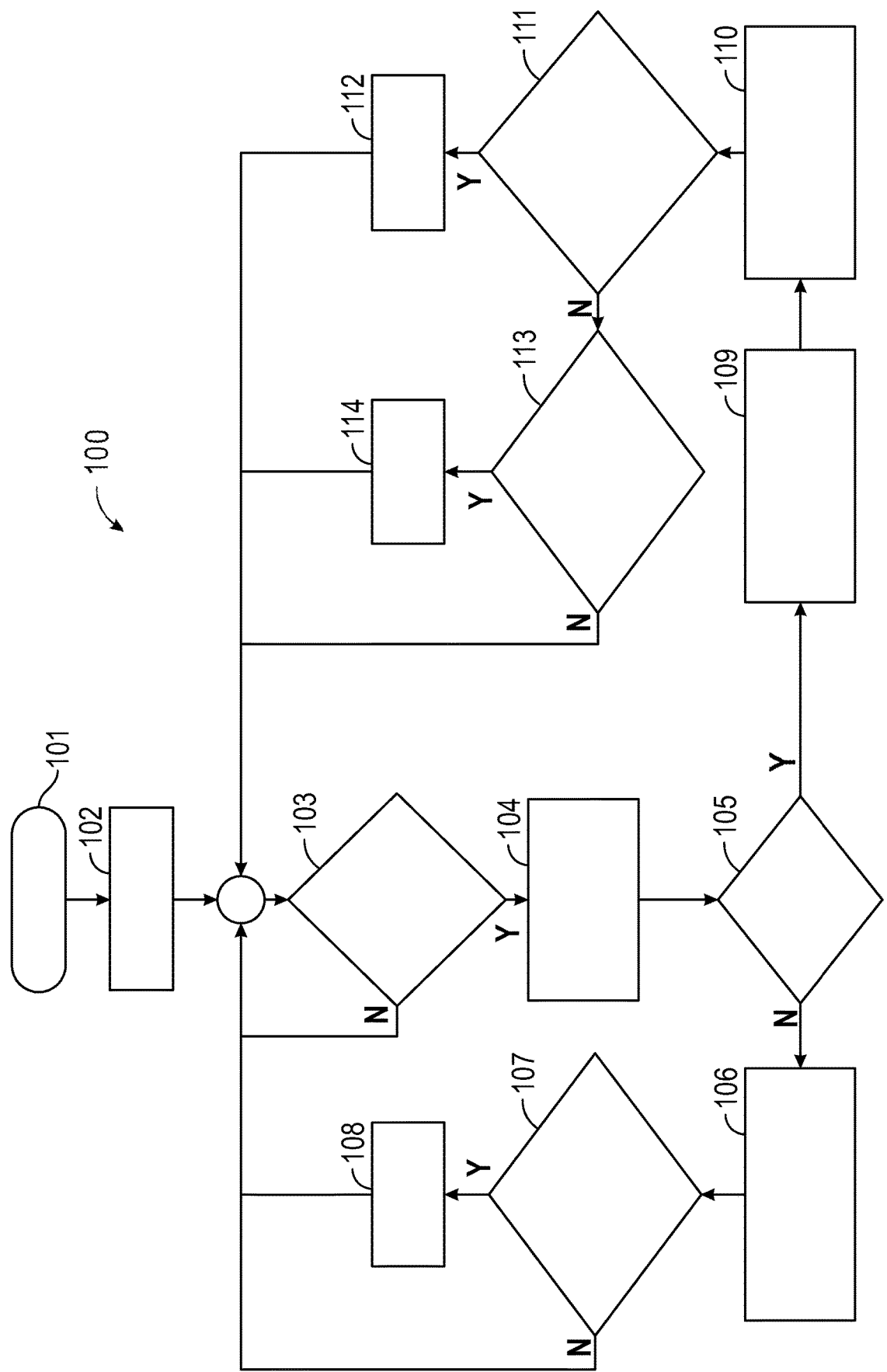
FIG. 3 is a flow diagram depicting aspects of a method of detecting and/or diagnosing faults in a redundant grounding system, in accordance with an exemplary embodiment.

FIG. 3 depicts an embodiment of a method 100 of monitoring an electrical component, detecting ground faults and/or diagnosing ground faults. The method 100 may be performed in conjunction with the vehicle 10 and one or more electrical components 70 (e.g., one or more control units). However, the method 100 is not so limited and may be used with any suitable electrical system that features redundant grounding, and any suitable redundant grounding configuration. Aspects of the method 100 may be performed by a suitable processing device or combination of processing devices, such as a processing device in the electrical component (e.g., control unit processor).

The method 100 includes a number of steps or stages represented by blocks 101-114. The method 100 is not limited to the number or order of steps therein, as some steps represented by blocks 101-114 may be performed in a different order than that described below, or fewer than all of the steps may be performed.

At block 101, the processing device starts (e.g., when the vehicle 10 is started or keyed on) the method 100, and initializes various counters by setting each counter to zero (block 102). For example, a first counter (a "ground resistance diagnostic counter" or "diagnostic counter") is used to track a number of instances of detection of a ground fault associated with ground loss. The diagnostic counter is incremented or decremented (or maintained at zero) at each time point for which resistance is calculated. A second counter (a "derating counter") is used to indicate a type or severity level of a detected ground fault, and may be used to determine how much to derate the electrical component 70 if a fault is detected.

The method 100 is described as performing a fault detection process at a given time point (blocks 103-114). The fault detection process may be repeated for a plurality of successive time points during vehicle operation.

During the fault detection process, a resistance of each of a pair of ground lines is calculated. Also during the fault detection process, a difference between calculated resistances is estimated and used to determine whether a fault exists. The fault detection process may also include diagnosing a fault based on results of the process performed at other time points.

At block 103, the processing device determines whether the vehicle 10 is in a condition that is conducive to fault detection. Generally, the vehicle 10 is in a proper condition when there is a threshold steady state current through the electrical component 70. Other aspects that may be considered when determining whether the vehicle 10 is in a proper condition include driving mode, vehicle speed and vehicle state. For example, the vehicle 10 is in a proper condition when the vehicle is keyed on or under propulsion and a steady state current is detected.

At block 104, if the vehicle condition is proper, the processing device calculates the resistance of each ground at a given time point. The resistance is calculated based on measurements of ground line current and component voltage as discussed further herein. For example, the processing device calculates a first resistance $R_{G1}$ of the first ground line 68a and a second resistance $R_{G2}$ of the second ground line 68b when the electrical component 70 is powered and current is being applied.

At block 105, a difference between the first resistance $R_{G1}$ and the second resistance $R_{G2}$ is calculated, and the difference is compared to a threshold difference to determine whether the difference is greater than the threshold difference.

At block 106, if the difference is less than or equal to the threshold difference, the diagnostic counter is decremented (e.g., from one to zero, from two to one, etc.).

At block 107, the processing device determines whether the diagnostic counter is at zero. If not, the method 100 returns to block 103, where conditions are determined and resistance is calculated for another time point.

At block 108, if the diagnostic counter is equal to zero, the derating counter is set to zero, indicating that no fault is detected. The method 100 then returns to block 103.

At block 109, if the difference is greater than the threshold difference, the diagnostic counter is incremented (e.g., from zero to one, from one to two, etc.). At block 110, the processing device maintains a record of a maximum diagnostic counter value, which is the highest diagnostic counter value that has been reached. The processing device also maintains a record of the maximum difference and updates the maximum difference if the current difference (i.e., difference calculated at a current time point) exceeds the recorded maximum difference.

At block 111, the current diagnostic counter value (i.e., the value after the diagnostic counter is incremented for the current time point) is compared to a threshold value (referred to as an "open threshold") to determine whether the current counter value is greater than the open threshold. The open threshold is a value associated with a permanent or high severity fault. If the current counter value is greater than the open threshold, the processing device diagnoses the detected fault, for example, as a permanent fault.

At block 112, if the current counter value is greater than the open threshold, an indicator is generated or output indicating that a permanent fault has been detected. The indicator may correspond to a value of the derating counter, where higher counts indicate more severe faults. For example, the derating counter is set to two, indicating that a permanent fault has been detected.

At block 113, if the current counter value is less than or equal to the open threshold, the current diagnostic counter value is compared to another threshold value related to a less severe fault. For example, the current counter value is compared to a threshold count number (referred to as an "intermittent threshold"). If the current counter value is less than or equal to the intermittent threshold, the method 100 returns to block 103.

At block 114, if the current counter value is greater than the intermittent threshold, the detected fault is diagnosed as an intermittent fault. An indicator is generated or output indicating that an intermittent fault has been detected. For example, the derating counter is set to one, indicating that an intermittent fault has been detected. Blocks 103-114 may be repeated as desired for a plurality of time points.

The method 100 may also include one or more actions in response to detection of a ground fault. For example, an output indicator or alert may be provided to a driver or an automated driving state. The vehicle 10 can be stopped (by the driver or the automated driving system), or the driving mode can be changed, to avoid damage to electrical components. Other actions may include derating affected electrical components, and transmitting ground fault alerts and monitoring data (e.g., measured resistance, current and/or voltage) to a fleet management system or other external system.

It is noted that the method 100 is not limited to use with two grounds. If more than two grounds are present, the method 100 may be repeated for each successive pair of adjacent grounds. For example, the method 100 is performed using the ground lines 68a and 68b, and then repeated using the ground lines 68b and 68n.

In addition, the method 100 is not limited to detection of ground faults based on the diagnostic counter. Other factors that may be considered when diagnosing a detected ground fault include an amount of time during which a fault was detected, number of time points for which a fault was detected, frequency of fault detections, the maximum resistance difference and others. For example, a higher resistance difference may be indicative of a more severe fault.

Figure 4:
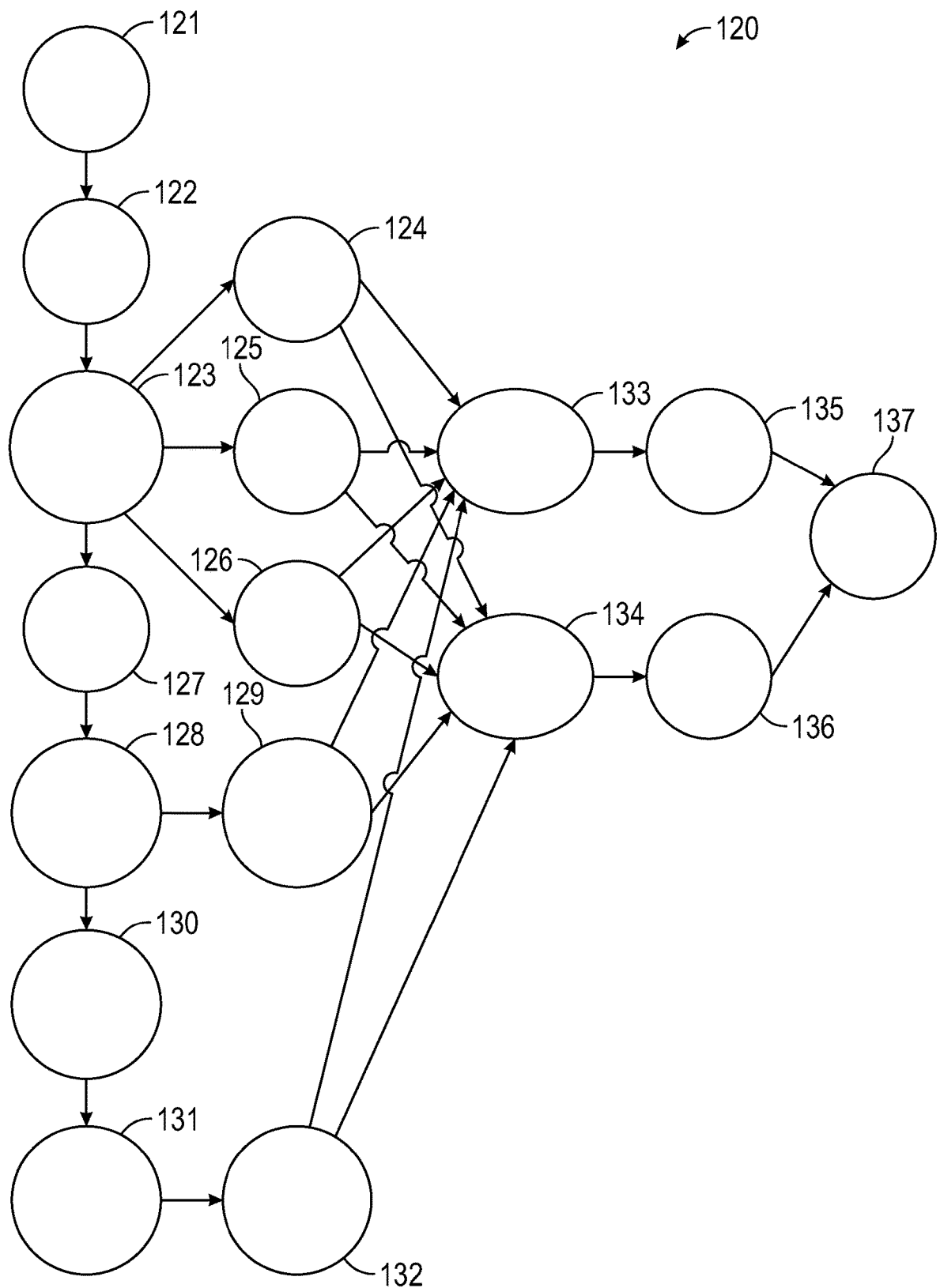
FIG. 4 is a flow diagram depicting aspects of a method of estimating resistances of ground lines in a redundant grounding system, in accordance with an exemplary embodiment.

FIG. 4 depicts an embodiment of a method 120 of calculating ground resistance. The method 120 may be performed as part of block 104 of the method 100. The method 120 may be performed in conjunction with the vehicle 10 and one or more electrical components 70 (e.g., one or more control units). However, the method 120 is not so limited and may be used with any suitable electrical system that features redundant grounding. Aspects of the method 120 may be performed by a suitable processing device or combination of processing devices, such as a processing device in the electrical component (e.g., control unit processor).

The method 120 includes a number of steps or stages represented by blocks 121-137. The method 120 is not limited to the number or order of steps therein, as some steps represented by blocks 121-137 may be performed in a different order than that described below, or fewer than all of the steps may be performed.

At block 121, the processing device confirms that a steady state current through the electrical component 70 has been achieved. If not, the processing device can control the electrical component 70 or instruct another vehicle system to provide current to the electrical component 70.

At block 122, the first and second ground lines 68a and 68b are connected to the electrical component 70. For example, the bi-directional switches 64a and 64b are closed to connect the ground lines 68a and 68b to the electrical component 70.

At block 123, current measurements are performed. In an embodiment, a first current ($I_{G1}$) through the first ground line 68a is measured (block 124), and a second current ($I_{G2}$) through the second ground line 68b is measured (block 125). In addition, at block 126, the total current/through both ground lines is calculated.

At block 127, the second ground line 68b is disconnected from the electrical component 70 by opening the bi-directional switch 64b. At block 128, a first voltage ($V_{M1}$) across the electrical component 70 is measured. The resulting voltage (i.e., voltage when the component 70 is only grounded by ground line 68a) is output at block 129.

At block 130, the second ground line 68b is reconnected by closing the bi-directional switch 64b, and the first ground line 68a is disconnected by opening the bi-directional switch 64a. At block 131, a second voltage ($V_{M2}$) across the electrical component 70 is measured. The resulting voltage (i.e., voltage when the component 70 is only grounded by ground line 68b) is output at block 132.

At block 133, the resistance $R_{G1}$ of the ground line 68a is calculated based on the following equation:

$$R_{G1} = (V_{M2} - V_{M1})/(I^{*}(1 - I_{G1}/I_{G2})). \quad (1)$$

In addition, at block 134, the resistance $R_{G2}$ of the ground line 68b is calculated based on the following equation:

$$R_{G2} = (V_{M1} - V_{M2})/(I^{*}(1 - I_{G2}/I_{G1})). \quad (2)$$

The resistances $R_{G1}$ and $R_{G2}$ may then be used as part of the method 100 to detect faults and/or diagnose faults (e.g., as permanent or intermittent).

In addition to fault detection as per the method 100, fault detection can be realized in other ways. For example, at block 135, the resistance $R_{G1}$ is compared to a maximum resistance ($R_{G1}$ limit). At block 136, the resistance $R_{G2}$ is compared to a maximum resistance ($R_{G2}$ limit). At block 137, if either resistance exceeds its respective limit, an indicator such as a flag is output as a fault indicator.

Figure 5:
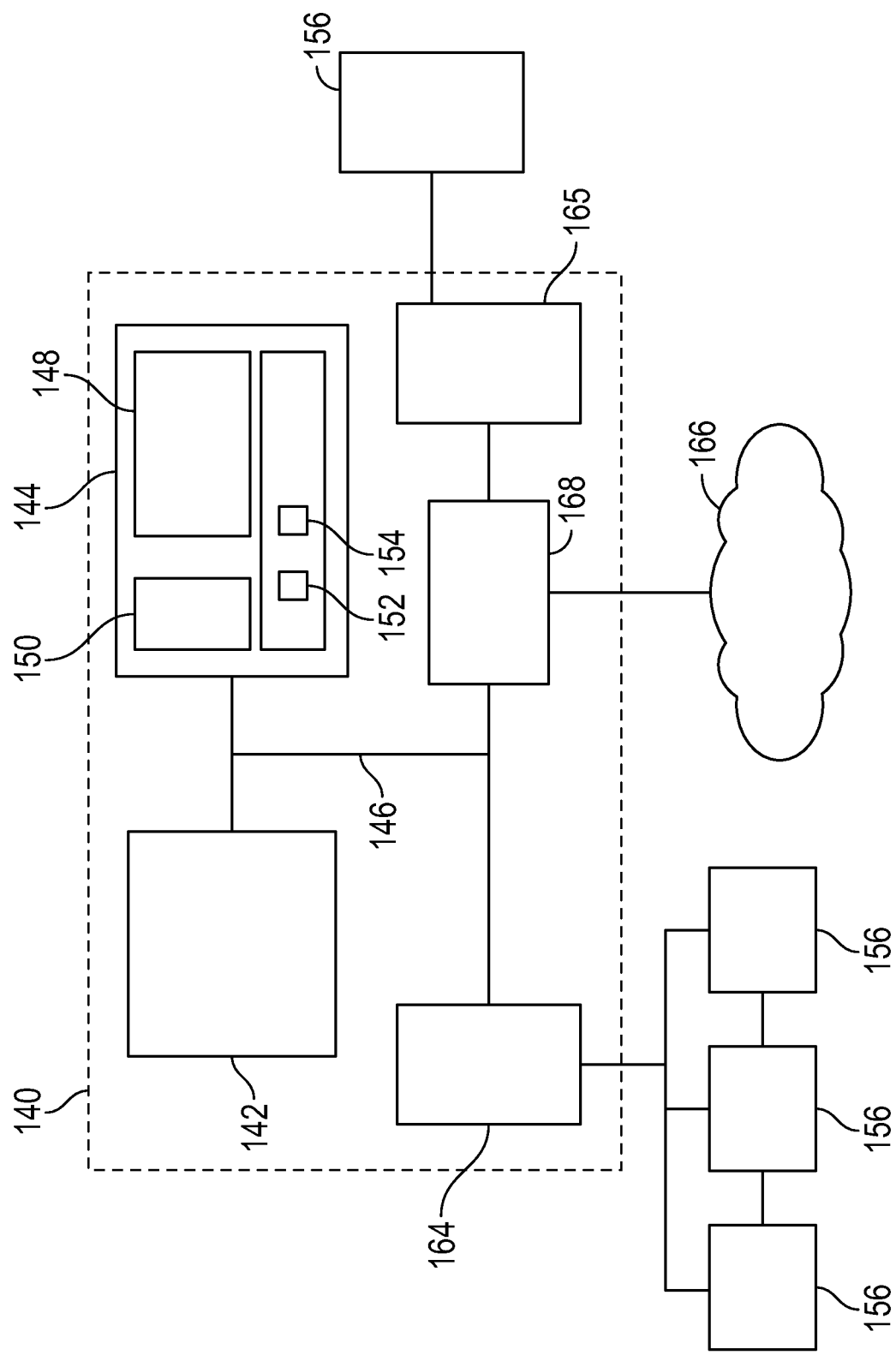
FIG. 5 depicts a computer system in accordance with an exemplary embodiment.

FIG. 5 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to control of electrical components, and a module 154 may be included to perform functions related to fault detection and diagnosis as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of detecting ground loss of an electrical component, the method comprising:
    monitoring a ground circuit including a first ground line connected to the electrical component and a second ground line connected to the electrical component, wherein the monitoring includes measuring a current through each of the first ground line and the second ground line, and measuring a voltage through each of the first ground line and the second ground line;
    calculating a first resistance of the first ground line and a second resistance of the second ground line based on the measured current and the measured voltage;
    estimating a difference between the first resistance and the second resistance, and comparing the estimated difference to a threshold difference, wherein the calculating and estimating the difference is performed at each of a plurality of time points;
    based on the estimated difference being greater than the threshold difference, detecting a ground fault, diagnosing the ground fault based on a number of time points for which the ground fault is detected, and outputting an indication of the ground fault, wherein the ground fault is diagnosed as an intermittent fault based on the number of time points being greater than a first threshold number, and the ground fault is diagnosed as a permanent fault based on the number of time points being greater than a second threshold number, the second threshold number being greater than the first threshold number; and
    based on detecting the ground fault, performing at least one of derating the electrical component and controlling a vehicle that includes the electrical component.

2. The method of claim 1, wherein the number of time points is determined based on incrementing a diagnostic counter.

3. The method of claim 1, wherein the diagnostic counter is incremented for each time point at which the ground fault is detected.

4. The method of claim 1, wherein diagnosing the ground fault includes determining a level of severity of the ground fault based on at least one of:
    a value of the estimated difference, the number of time points at which the ground fault is detected, and a length of a time period during which the ground fault is detected.

5. The method of claim 1, wherein the indication is output to at least one of a driver, a vehicle control system and an external system.

6. The method of claim 1, wherein the ground circuit includes a first switch connected between the first ground line and the electrical component and a second switch connected between the second ground line and the electrical component.

7. The method of claim 6, wherein calculating the first resistance and the second resistance includes:
    generating a current through the electrical component;
    measuring a first current through the first ground line, a second current through the second ground line and a total current when the first switch and the second switch are closed;
    measuring a first voltage of the electrical component when the first switch is closed and the second switch is open;
    measuring a second voltage of the electrical component when the first switch is open and the second switch is closed; and
    calculating the first resistance and the second resistance based on a difference between the first voltage and the second voltage, the first current, the second current and the total current.

8. The method of claim 7, wherein the first resistance is calculated based on:

$$R_{G1} = (V_{M2} - V_{M1})/(I^*(1 - I_{G1}/I_{G2})),$$

and
the second resistance is calculated based on:

$$R_{G2} = (V_{M1} - V_{M2})/(I^*(1 - I_{G2}/I_{G1})),$$

wherein $R_{G1}$ is the first resistance, $R_{G2}$ is the second resistance, $V_{M1}$ is the first voltage, $V_{M2}$ is the second voltage, $I^*$ is the total current, $I_{G1}$ is the first current and $I_{G2}$ is the second current.

9. The method of claim 1, wherein the electrical component is a control module of the vehicle.

10. A system for detecting ground loss of an electrical component, the system comprising:

a ground circuit including a first ground line connected to the electrical component and a second ground line connected to the electrical component; and a processing device configured to measure a current through each of the first ground line and the second ground line, and measure a voltage through each of the first ground line and the second ground line, the processing device configured to perform:

calculating a first resistance of the first ground line, and a second resistance of the second ground line based on the measured current and the measured voltage;

estimating a difference between the first resistance and the second resistance, and comparing the estimated difference to a threshold difference, wherein the calculating and estimating the difference is performed at each of a plurality of time points;

based on the estimated difference being greater than the threshold difference, detecting a ground fault, diagnosing the ground fault based on a number of time points for which the ground fault is detected, and outputting an indication of the ground fault, wherein the ground fault is diagnosed as an intermittent fault based on the number of time points being greater than a first threshold number, and the ground fault is diagnosed as a permanent fault based on the number of time points being greater than a second threshold number, the second threshold number being greater than the first threshold number; and based on detecting the ground fault, performing at least one of derating the electrical component and controlling a vehicle that includes the electrical component.

11. The system of claim 10, wherein the number of time points is determined based on incrementing a diagnostic counter.

12. The system of claim 10, wherein the diagnostic counter is incremented for each time point at which the ground fault is detected.

13. The system of claim 10, wherein diagnosing the ground fault includes determining a level of severity of the ground fault based on at least one of:

a value of the estimated difference, the number of time points at which the ground fault is detected, and a length of a time period during which the ground fault is detected.

14. The system of claim 10, wherein the indication is output to at least one of a driver, a vehicle control system and an external system.

15. The system of claim 10, wherein the ground circuit includes a first switch connected between the first ground line and the electrical component and a second switch connected between the second ground line and the electrical component, and calculating the first resistance and the second resistance includes:

generating a current through the electrical component;

measuring a first current through the first ground line, a second current through the second ground line and a total current when the first switch and the second switch are closed;

measuring a first voltage of the electrical component when the first switch is closed and the second switch is open;

measuring a second voltage of the electrical component when the first switch is open and the second switch is closed; and calculating the first resistance and the second resistance based on a difference between the first voltage and the second voltage, the first current, the second current and the total current.

16. The system of claim 15, wherein the first resistance is calculated based on:

$$R_{G1} = (V_{M2} - V_{M1})/(I^*(1 - I_{G1}/I_{G2})),$$

the second resistance is calculated based on:

$$R_{G2} = (V_{M1} - V_{M2})/(I^*(1 - I_{G2}/I_{G1})),$$

wherein $R_{G1}$ is the first resistance, $R_{G2}$ is the second resistance, $V_{M1}$ is the first voltage, $V_{M2}$ is the second voltage, $I^*$ is the total current, $I_{G1}$ is the first current and $I_{G2}$ is the second current.

17. A vehicle system comprising:

a memory having computer readable instructions; and a processing device for executing the computer readable instructions, the computer readable instructions controlling the processing device to perform a method including:

monitoring a ground circuit including a first ground line connected to an electrical component and a second ground line connected to the electrical component, wherein the monitoring includes measuring a current through each of the first ground line and the second ground line, and measuring a voltage through each of the first ground line and the second ground line;

calculating a first resistance of the first ground line, and a second resistance of the second ground line based on the measured current and the measured voltage;

estimating a difference between the first resistance and the second resistance, and comparing the estimated difference to a threshold difference, wherein the calculating and estimating the difference is performed at each of a plurality of time points;

based on the estimated difference being greater than the threshold difference, detecting a ground fault, diagnosing the ground fault based on a number of time points for which the ground fault is detected, and outputting an indication of the ground fault, wherein the ground fault is diagnosed as an intermittent fault based on the number of time points being greater than a first threshold number, and the ground fault is diagnosed as a permanent fault based on the number of time points being greater than a second threshold number, the second threshold number being greater than the first threshold number; and based on detecting the ground fault, performing at least one of derating the electrical component and controlling a vehicle that includes the electrical component.

18. The vehicle system of claim 17, wherein the number of time points is determined based on incrementing a diagnostic counter, and the diagnostic counter is incremented for each time point at which the ground fault is detected.

19. The vehicle system of claim 17, wherein the indication is output to at least one of a driver, a vehicle control system and an external system.

20. The vehicle system of claim 17, wherein the ground circuit includes a first switch connected between the first ground line and the electrical component and a second switch connected between the second ground line and the electrical component.

* * * * *